UNITED STATES PATENT OFFICE.

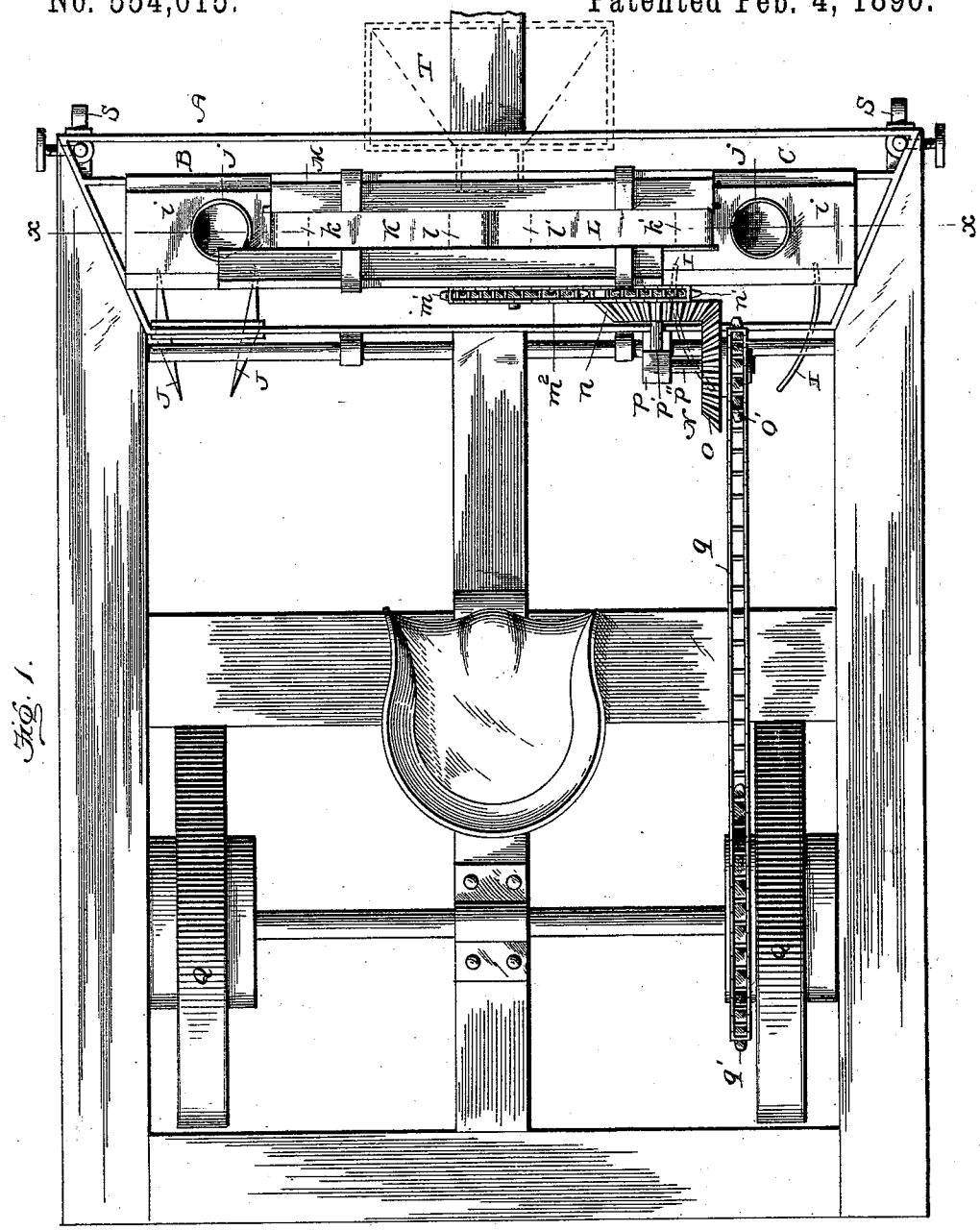

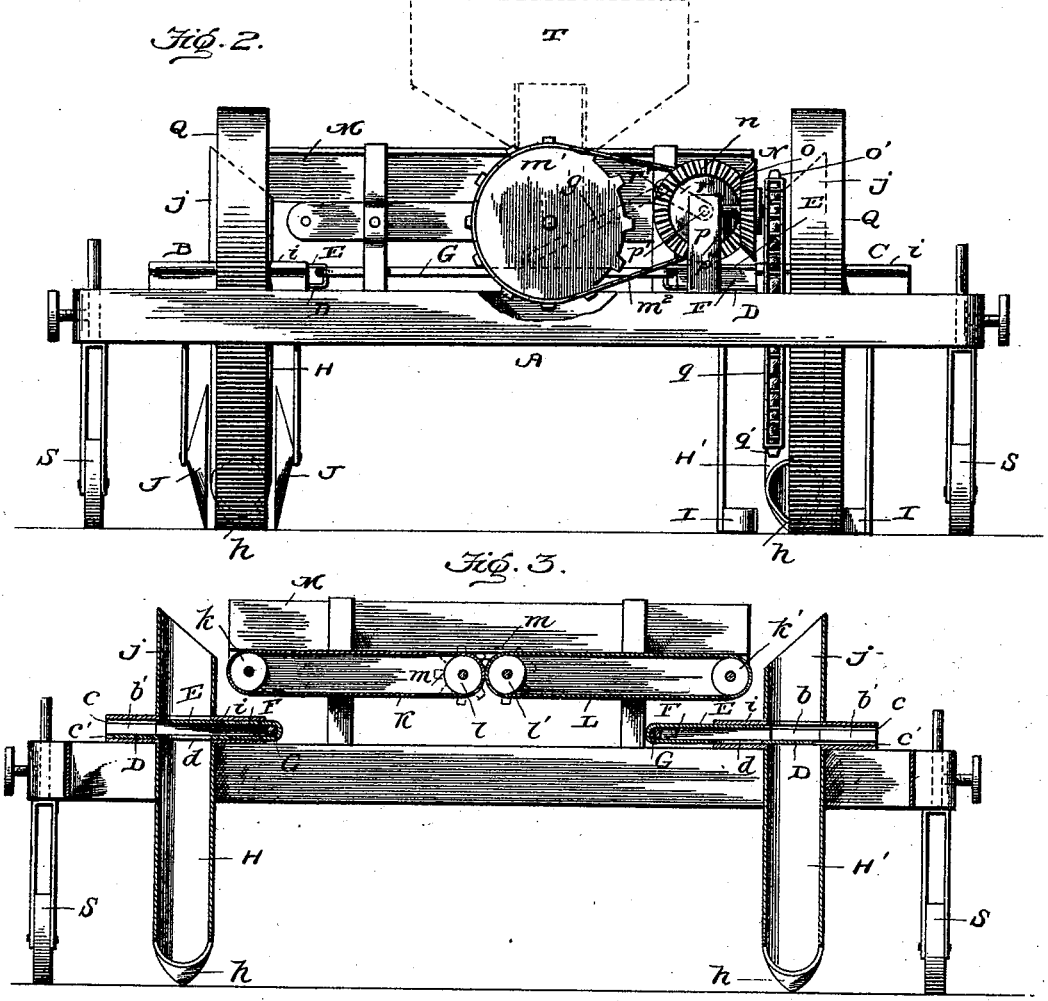
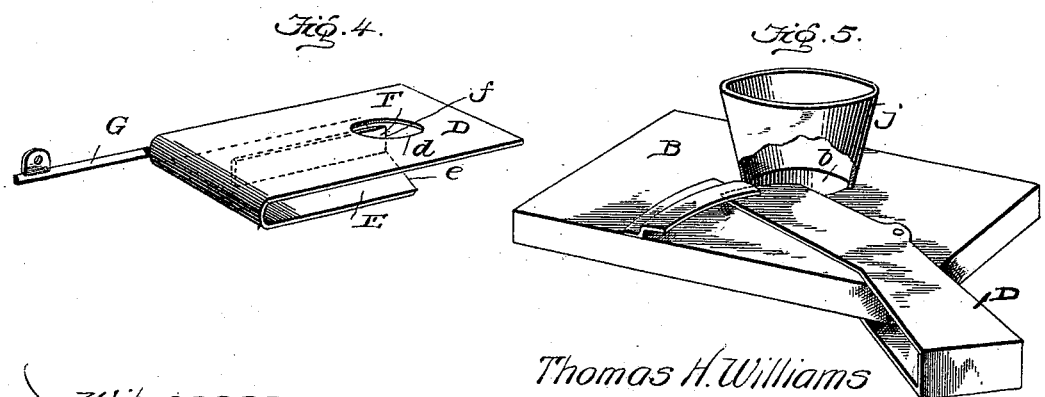

THOMAS H. WILLIAMS, OF DOLAND, SOUTH DAKOTA.

POTATO-PLANTER.

SPECIFICATION forming part of Letters Patent No. 554,015, dated February 4, 1896.

Application filed July 13, 1895. Serial No. 555,884. (No model.)

*To all whom it may concern:*

Be it known that I, THOMAS H. WILLIAMS, a citizen of the United States, residing at Doland, in the county of Spink and State of South Dakota, have invented certain new and useful Improvements in Potato-Planters; and I do hereby declare the following to be a full, clear, and exact description of the invention, such as will enable others skilled in the art to which it appertains to make and use the same.

My invention relates to improvements in potato-planters, embracing in its construction duplex mechanisms which are actuated from a common driving mechanism to work alternately and each performing the operation of cutting or slicing the potato which is fed thereto as well as dropping the same in the furrow.

I have devised and invented a novel construction of cutting and dropping mechanism, two of which are used, and each consisting of a spacing guide-block provided with a vertical opening or passage, a valve-plate arranged to move at intervals across the opening in said spacing-block, and a cutter-plate movable with the valve-plate but arranged and timed so as to cut or slice the potato before or at the time of dropping the potato in the spacing-block, whereby the potato is cut or sliced, and the piece or pieces are dropped in the furrow by an automatic contrivance. The cutter and valve mechanisms may be operated with a reciprocating motion, or an oscillating motion, or a rotary motion, but in the preferred embodiment of my invention hereinafter described I shall content myself with a description of cutter and dropper mechanisms actuated reciprocally. In this embodiment of the machine, the cutter and dropper mechanisms are mounted in a suitable framing which carries a horizontal chute or way into which the potatoes are deposited, and in this chute operate two aprons, the one to be driven to carry potatoes to the right-hand cutter and dropper and the other apron to be driven in the reverse direction to carry potatoes to the left-hand cutter and dropper. Said conveyer-aprons and the cutter and dropper mechanisms are driven from a common power mechanism which consists of a set of intermeshing gears, one of which is belted or connected by a sprocket-chain to a carrying-wheel of the machine, while the other gear has a wrist-pin driving a pitman that is connected to the reciprocating rod to which the valve and cutter plates are fastened. Furthermore, this last-named gear has a sprocket-wheel which has a sprocket-chain passing around a sprocket-wheel fastened on the shaft of one of the driving-pulleys which support the aprons, the shafts of two adjacent apron-rollers being geared directly together for simultaneous rotation in opposite directions.

The invention further consists in the novel combination of devices, and in the construction and arrangement of parts, which will be hereinafter fully described and claimed.

To enable others to understand my invention I have illustrated the preferred embodiment thereof in the accompanying drawings, forming a part of this specification, in which—

Figure 1 is a plan view of my potato-planter. Fig. 2 is an elevation looking at the rear side of the machine. Fig. 3 is a longitudinal sectional view on the plane indicated by the dotted line $xx$ of Fig. 1. Fig. 4 is an inverted perspective view of my perferred form of cutter and dropper construction and adapted for reciprocal movement. Fig. 5 is a detail view of a modified construction, in which the cutter and valve plates are pivoted to swing or oscillate. Fig. 6 is a detail view of the guide-block in which the reciprocating valve-plate and cutters shown by Fig. 3 are supported and guided.

Like letters of reference denote corresponding parts in all the figures of the drawings, referring to which—

A designates a frame which may be built to carry my improved potato-planter and be attached in a suitable way to an ordinary corn-planter frame, or said frame A may be built to serve as the frame of the potato-planting machine itself instead of as an attachment to a corn-planter. On this frame A are secured the spacing-blocks B C, which are arranged a suitable distance from each other. Each spacing-block is provided with a vertical passage or opening $b$, a longitudinal central slot $b'$ extending from one side of the opening $b$ to the inner end of the block, and parallel guideways or flanges $c\ c'$, which extend longitudinally of the block and arranged at the top and lower side of the block, respectively.

Each cutter and dropper consists of the valve-plate D, the horizontal cutter-plate E and the vertical cutter-blade F, all of which are suitably joined or fastened together beyond the inner side of the spacing-block. The valve-plate D has its side edges fitted in the ways $c'$, the cutter-plate E is fitted in the ways $c$, and the vertical blade F is fitted in the slot $b'$ of the guide-block. The outer end of the valve-plate D extends a suitable distance beyond the front cutting-edges, $e\,f$, of the blade and knife E F, respectively, and said valve-plate D has a vertical opening $d$ through which the pieces or slices of potato may drop after they have been cut and halved by the blade and plate. The vertical blade F is arranged centrally with relation to the knife-plate E and valve-plate D.

When the end of the potato is thrust or fed into the vertical opening $b$ of the guide-block B or C and the valve-plate and cutters are drawn back so that the solid forward end of the valve-plate D lies over the tube H, one end of the potato rests upon the solid forward protruding end of the valved plate, which plate closes the lower part of the vertical opening $b$ in the guide-block, and when the cutters E F are forced forward with the valve-plate the cutter E cuts a piece off the end of the potato and the blade F halves the cut piece or slice of potato, which pieces of potato are free to drop through the opening $d$ in the valve-plate because the valve-plate is adjusted with the two cutters E F, so that by the time the potato is cut the valve-plate will have been moved far enough for the opening $d$ therein to be in line with the vertical opening $b$ in the spacing guide-block. These two cutter and dropper devices are connected together by the reciprocating rod G, the ends of which are rigidly fastened to the inner ends of the cutter and dropper plates, and as this rod is reciprocated it operates to impart sliding movement to the two sets of cutter and dropper plates, whereby the cutter and dropper plates in the guide-blocks B C operate alternately so as to sever potatoes and drop pieces thereof into the furrows. This rod G has a pitman $g$ pivotally connected thereto, and said pitman is operated by the driving mechanism presently described.

H H' are the drill-tubes which are carried by the frame A in positions beneath the guide-blocks B C to receive the pieces of potatoes from the vertical openings $b$ in said blocks, and at their lower ends these drills-tubes have the points or shovels $h$, of any preferred construction.

The pieces of potatoes after they have been deposited in the furrows are covered over with earth by means of the shovels I I or the pulverizing-disks J J, either of which may be used, although I have shown the machine as being equipped with both shovels and disks. The shovels are arranged in reversed angular positions relatively to each other, and they are fastened to hangers suitably attached to the frame A. The pulverizing-disks are made of concavo-convex or dished form, and they are independently journaled on hangers pendent from the frame A, said disks being also arranged in angular relation to each other to throw the dirt into a hill after the potato-pieces have been deposited by the drill-tube in the furrow.

The upper sides of the two guide-blocks are closed by the cap-plates $i\,i$, on which are mounted the guide-tubes $j\,j$, said tubes being fixed to the cap-plates in vertical alignment with the openings $b$ in the blocks B C. The upper ends of said vertical guide-tubes are beveled or cut off in slanting directions to enable the potatoes to be readily deposited or fed into said tubes from the oppositely-running aprons or belts K L. These aprons or belts are arranged in the same horizontal plane with each other and within a bottomless trough or chute M, the latter being supported, by suitable devices attached to the frame A, in a horizontal position above the frame A and the blocks B C thereon between the vertical guide-tubes $j\,j$, the ends of said chute or way terminating close up to the beveled or slanting upper ends of said tubes $j\,j$. The aprons K L form a movable or traveling bottom to the trough M, and each apron extends about half-way of the length of the trough. The outer ends of the aprons are supported by the idler-rollers $k\,k'$, suitably journaled in the lower parallel sides of the trough, and the inner ends of the aprons are supported by the driving-rollers $l\,l'$, the shafts of which are journaled in bearings in the walls of the troughs, whereby each apron is supported by two rollers, one of which is an idler-roller and the other a driving-roller. The shafts of the two driving-rollers $l\,l'$ are geared together for positive rotation in opposite directions by the intermeshing gears $m\,m$, suitably fastened to one end of the two shafts of said driving-rollers, and the other extended end of the shaft of one driving-roller has a sprocket-wheel $m'$, around which passes a sprocket-chain $m^2$, that is driven by the driving mechanism N. Said driving mechanism consists of the beveled gear $n$ having a sprocket-wheel $n'$, another beveled gear $o$ provided with a sprocket-wheel $o'$, and an upright support $p$ having the arms $p'\,p''$, which form the journals for the gears $n\,o$. This support $p$ is suitably fastened to the frame A, and the arms $p'\,p''$ extend at right angles to each other outwardly from said support, in order that the gears $n\,o$ may be maintained in proper relation to each other for the teeth thereon to intermesh. Around the sprocket-wheel $o'$ on the gear $o$ passes a sprocket-chain $q$, which also passes around a sprocket-wheel $q'$ on the hub of one of the carrying-wheels Q of the machine, in order to transmit motion from the wheel Q to the gear $o$ and thence to the gear $n$.

The sprocket-chain $m^2$ engages with the sprocket-wheel $n'$ on the gear $n$ to transmit motion to the wheel $m$ and thence to the two roller-shafts $l\ l'$, and said bevel-gear $n$ also carries a crank-arm $r$ provided with a wrist-pin $r'$, to which is connected the outer end of the pitman $g$, that imparts motion to the rod G connecting the cutter and dropper mechanisms of the machine.

The frame A is maintained the proper distance and in the proper level condition above the ground by means of the gage-wheels S S, which are carried by vertically-adjustable hangers suitably attached to the frame; and these gage-wheels may be readily adjusted to regulate the penetration of the drills and the depth of planting the potatoes in the furrows.

If desired, a hopper T may be supported in an elevated position above the horizontal trough M, from which hopper leads a contracted throat to conduct the potatoes to the trough; but I prefer to omit this hopper and to employ an attendant, who can ride on the machine, to feed the potatoes to the trough.

The operation of my machine may be described as follows: The potatoes are fed to the trough M and conveyed by the oppositely-traveling aprons K L to the feed-tubes $j\ j$, the machine being in motion across the field to operate the driving mechanism N, which in turn rotates the rollers $l\ l'$ to drive the aprons, as well as move the pitman $g$, the coupling-bar G, and the two sets of cutter and valve plates. The potatoes are fed end-foremost into the tubes $j\ j$, and as the rod G moves in one direction it causes the cutters E F and valve D in block B to sever one potato and drop its pieces through tube H into one furrow; but on the reverse motion of rod G the cutters E F and valve-plate D in block C are caused to cut the potato and drop the pieces in the other tube, H', and deposit the same into the other furrow, the pieces of potatoes in the two furrows being covered with soil by the action of the blades I or disks J, whichever may be used on the machine.

The gears $n\ o$ of the driving mechanism may be readily removed from the journals $p'\ p''$ to enable gears of different sizes to be substituted for the purpose of planting the potatoes at different distances apart.

While I have described my preferred construction of cutter and dropper plates as capable of a reciprocating sliding motion, yet I do not strictly confine myself to the employment of reciprocating devices because I am aware that the cutter-plate E and valve-plate D may be constructed, as shown by Fig. 5, to oscillate over the vertical opening $b$ in the guide-block B or C; also that the cutter and valve plate may be arranged to rotate in the vertical plane of said opening $b$ in the guide-block.

In the modification shown by Fig. 5, the cutter and valve plates are arranged out of line with each other, and they are hung or pivoted to swing back and forth over the opening $b$ in order that the plate D may catch the piece of potato after it has been cut by plate E and to enable plate D to drop the cut potato when plate E moves to cut off another piece of potato.

Having thus fully described my invention, what I claim as new, and desire to secure by Letters Patent, is—

1. In a potato-planter, the combination of a horizontal trough, driving-rollers situated transversely within the trough and geared together to rotate in opposite directions, transverse idler-rollers situated on opposite sides of the driving-rollers and near the ends of said trough, the independent oppositely-traveling aprons or belts each extending from one driving-roller to and around its complemental idler-roller, two cutter and dropper devices arranged below the outer ends of aprons or belts, and a common power mechanism operatively connected with the driving-rollers and with the cutter and dropper devices, substantially as and for the purposes described.

2. In a potato-planter, the combination with a horizontal trough, of transverse driving-rollers geared together and situated at the middle of said trough, idler-rollers at the ends of said trough, independent aprons or belts each passing around one driving-roller and idler-roller, the reciprocating cutter and dropper devices connected together for operation simultaneously and situated below the delivery ends of the aprons or belts, a drive-gear, connections between the drive-gear and the cutter and dropper devices to reciprocate the same, and connections between the drive-gear and the driving-rollers to rotate the latter, substantially as and for the purposes described.

3. In a potato-planter, the fixed horizontal guides or supports having vertical feed-openings, the cutter and dropper devices fitted to slide in said horizontal guides or supports and each comprising the connected cutter-plate and valve-plate, a rod or bar connecting the two cutter and dropper devices, a horizontal trough above the guides or supports, upright tubes erected on the guides or supports and arranged to receive from the horizontal trough, the feed-aprons within the horizontal trough to deliver to the upright tubes, and a common drive mechanism geared to the apron-supporting rollers and having connections with the rod or bar of the cutter and dropper devices, substantially as and for the purposes described.

4. In a potato-planter, the combination with a feed mechanism, and cutter and dropper devices arranged on opposite sides of a frame and below the feed mechanism, of a common driving mechanism consisting of intermeshing gears, one of which is driven from a carrying-wheel, and the other gear having a pitman connected to the cutter and dropper devices and also having gear connections with the feed mechanism, substantially as described.

5. In a potato-planter, the guide-block having the upper and lower guides or ways and a vertical feed-opening, a cutter-plate fitted in the upper guide of said block, a perforated valve-plate fitted in the lower guide of the block, and means for rigidly connecting the valve and cutter plates, in combination with a reciprocating driving mechanism connected to the cutter and valve plates, and a feed mechanism to deliver to the vertical opening of said block, substantially as described.

In testimony whereof I affix my signature in presence of two witnesses.

THOMAS H. WILLIAMS.

Witnesses:
JOSEPH INNES,
BERTHA WENDT.